UNITED STATES PATENT OFFICE.

ISAIAH L. ROBERTS, OF BROOKLYN, ASSIGNOR TO THE ROBERTS-BREVOORT ELECTRIC COMPANY, (LIMITED,) OF NEW YORK, N. Y.

SECONDARY BATTERY.

SPECIFICATION forming part of Letters Patent No. 396,367, dated January 15, 1889.

Application filed May 1, 1888. Serial No. 272,519. (No model.)

*To all whom it may concern:*

Be it known that I, ISAIAH L. ROBERTS, a resident of the city of Brooklyn, county of Kings, and State of New York, and a citizen of the United States, have made a new and useful invention in Electric Batteries, of which the following is a specification.

My invention relates to storage-batteries in which the oxides of metals are carried by suitable conducting-supports. In such batteries trouble has been experienced in keeping the oxides in position, and sheets of felt have been used in contact with the plates. These, however, have not been satisfactory.

My invention consists in surrounding the plate or plates with a paste made from animal gelatinous or vegetable glutinous material, such as flour, starch, or gelatine. I take an ordinary storage-battery, and I take preferably starch and I mix the same into a paste with water, and I add after it is cold by mixing in it sulphuric or other suitable acid, one volume of acid being added to twenty volumes of paste. This paste is to be of such a consistency that it will not flow when the battery is tipped. This paste I pack or preferably force in around the elements, so that they are thoroughly immersed and preferably completely surrounded by the paste, which serves to hold the oxides upon the support. The paste fills the cell in which the elements are placed. I have discovered that chemical activity takes place through the paste with almost the same freedom as through the liquid generally employed, the paste, in fact, acting like solid water or as a permanent or fixed electrolyte.

In making the paste which is to surround the elements I may make it as follows: I take preferably ordinary starch and heat it preferably to about 212° Fahrenheit when mixed with water, using about two ounces of starch to a quart of water and thus form the paste. If acids are to be used, they must be added when the paste is cold and must be worked into it. If chloride of sodium, caustic soda, and the like are used, they may be added to the water before the cooking of the starch. The addition of sulphuric or other acids to the starch must be made when the starch paste is cold.

What I claim, and desire to secure by Letters Patent, is—

The combination, in an electric battery, of a suitable conductor carrying upon it the oxide of a metal with its coated side or sides in contact with a mass of paste, substantially as described, which holds the oxide in place upon the conductor and permits electrolysis.

ISAIAH L. ROBERTS.

Witnesses:
BERN. T. VETTERLEIN,
M. E. STODDARD.